Nov. 7, 1967 G. D. MARGOLIN 3,350,980
PHOTOGRAPHIC APPARATUS
Filed Jan. 8, 1965 11 Sheets-Sheet 1

INVENTOR
GEORGE D. MARGOLIN

BY *Darby & Darby*

ATTORNEYS

Nov. 7, 1967  G. D. MARGOLIN  3,350,980
PHOTOGRAPHIC APPARATUS
Filed Jan. 8, 1965  11 Sheets-Sheet 2

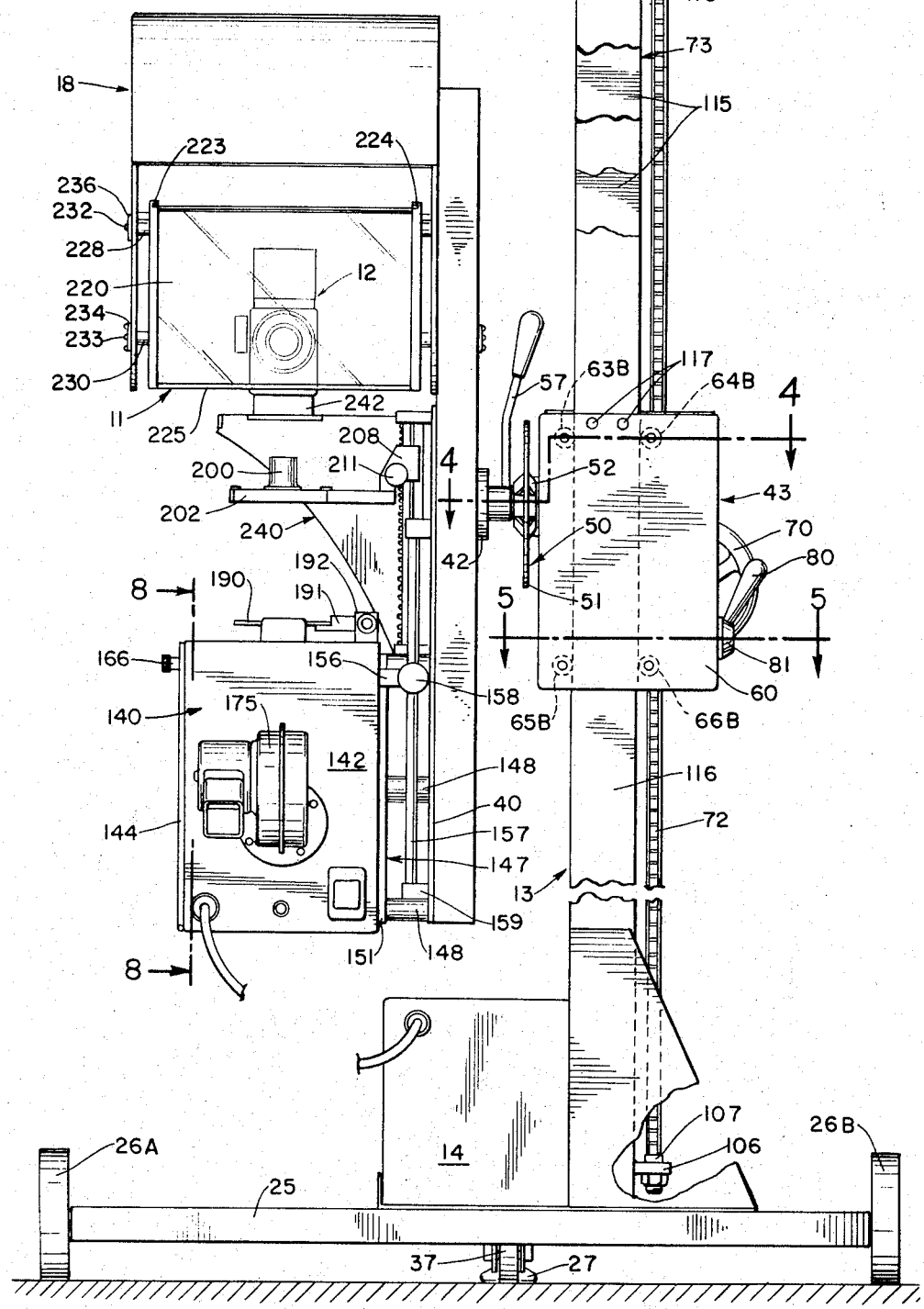

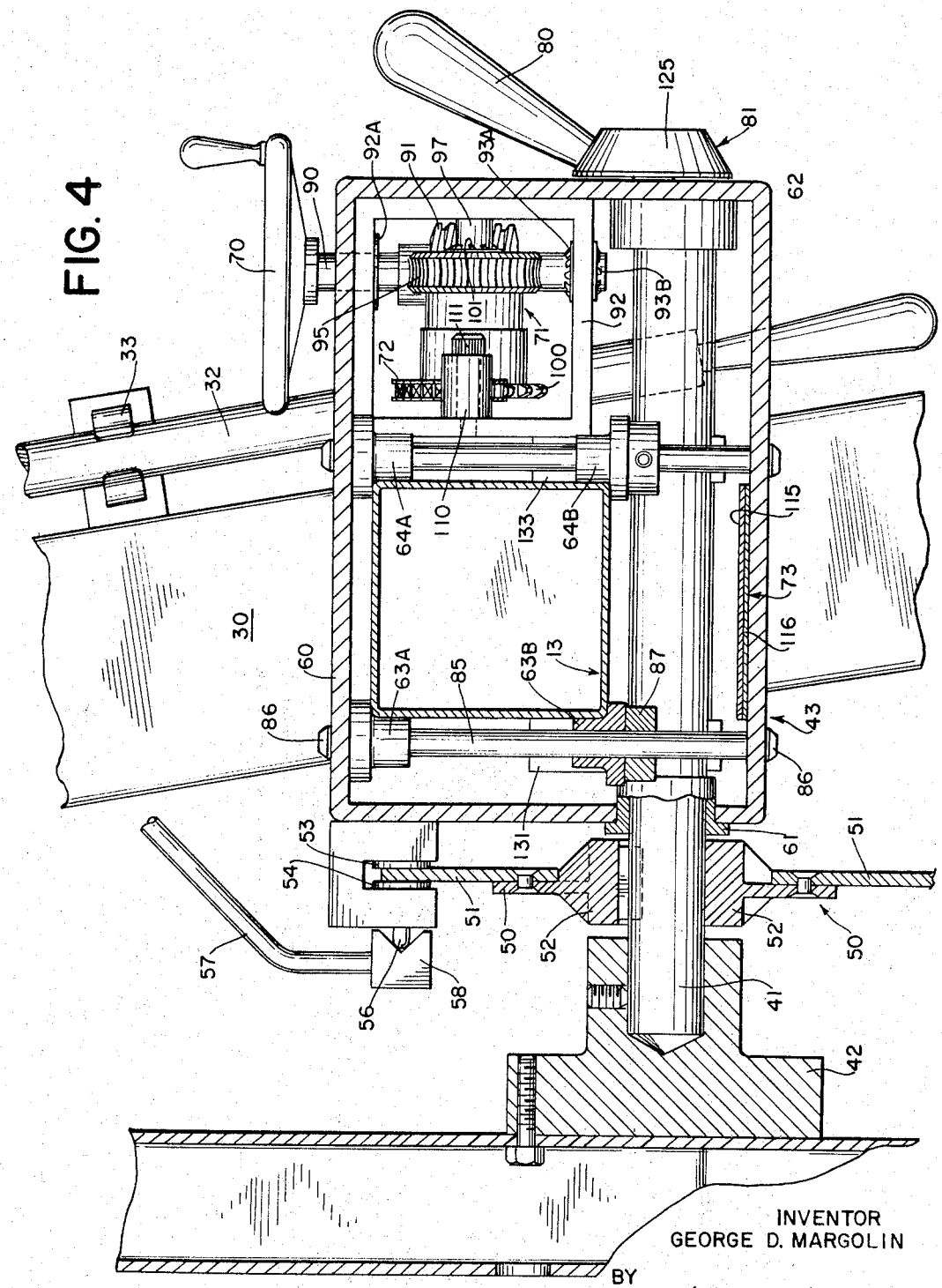

Nov. 7, 1967   G. D. MARGOLIN   3,350,980
PHOTOGRAPHIC APPARATUS
Filed Jan. 8, 1965
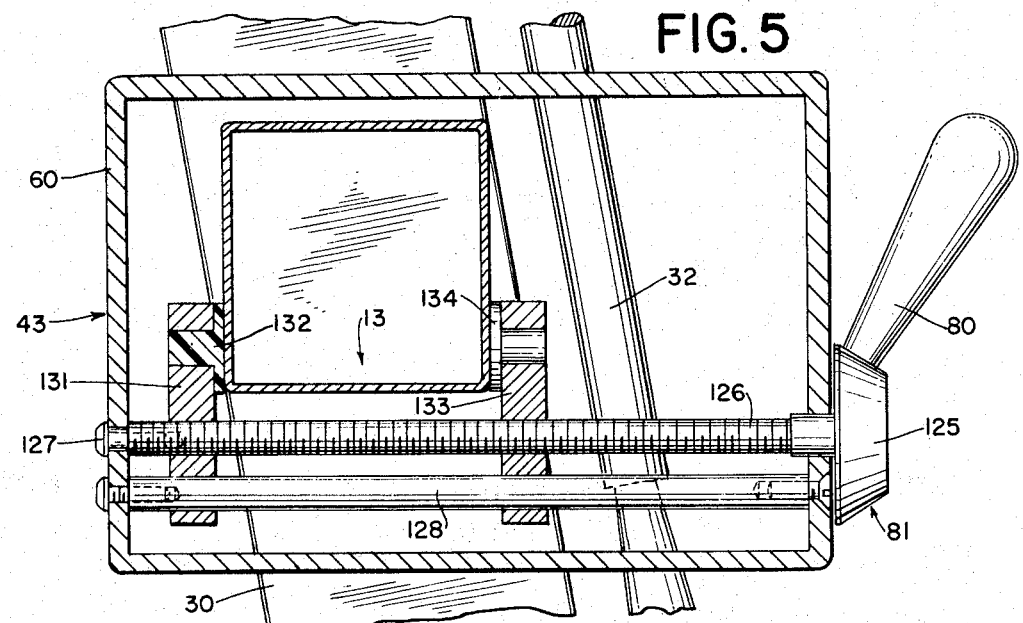
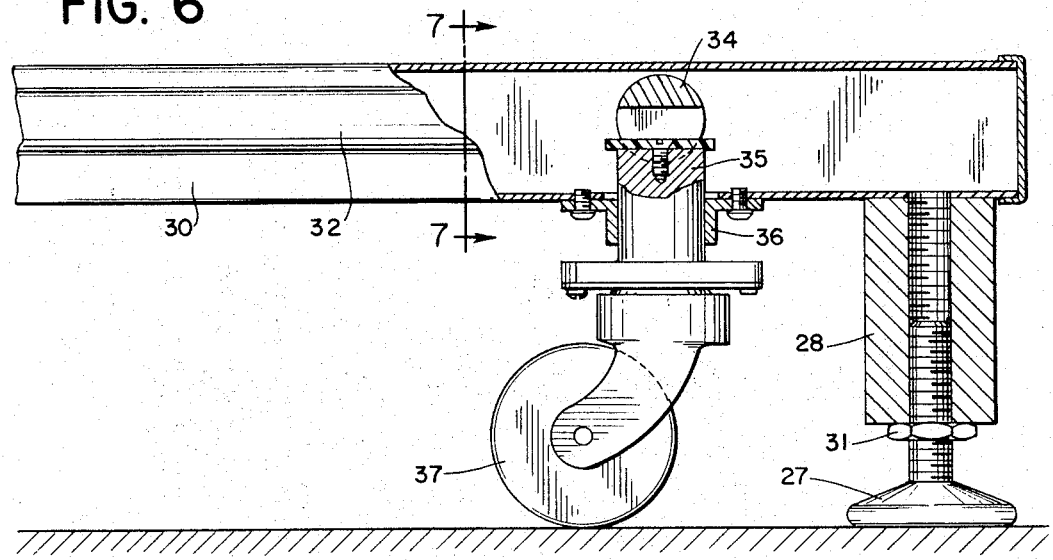
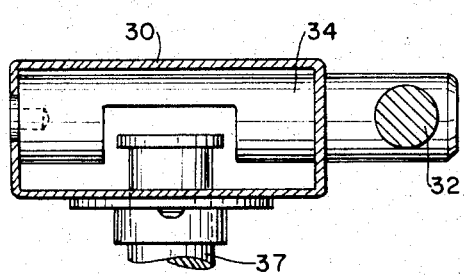
INVENTOR
GEORGE D. MARGOLIN
BY
Darby & Darby
ATTORNEYS

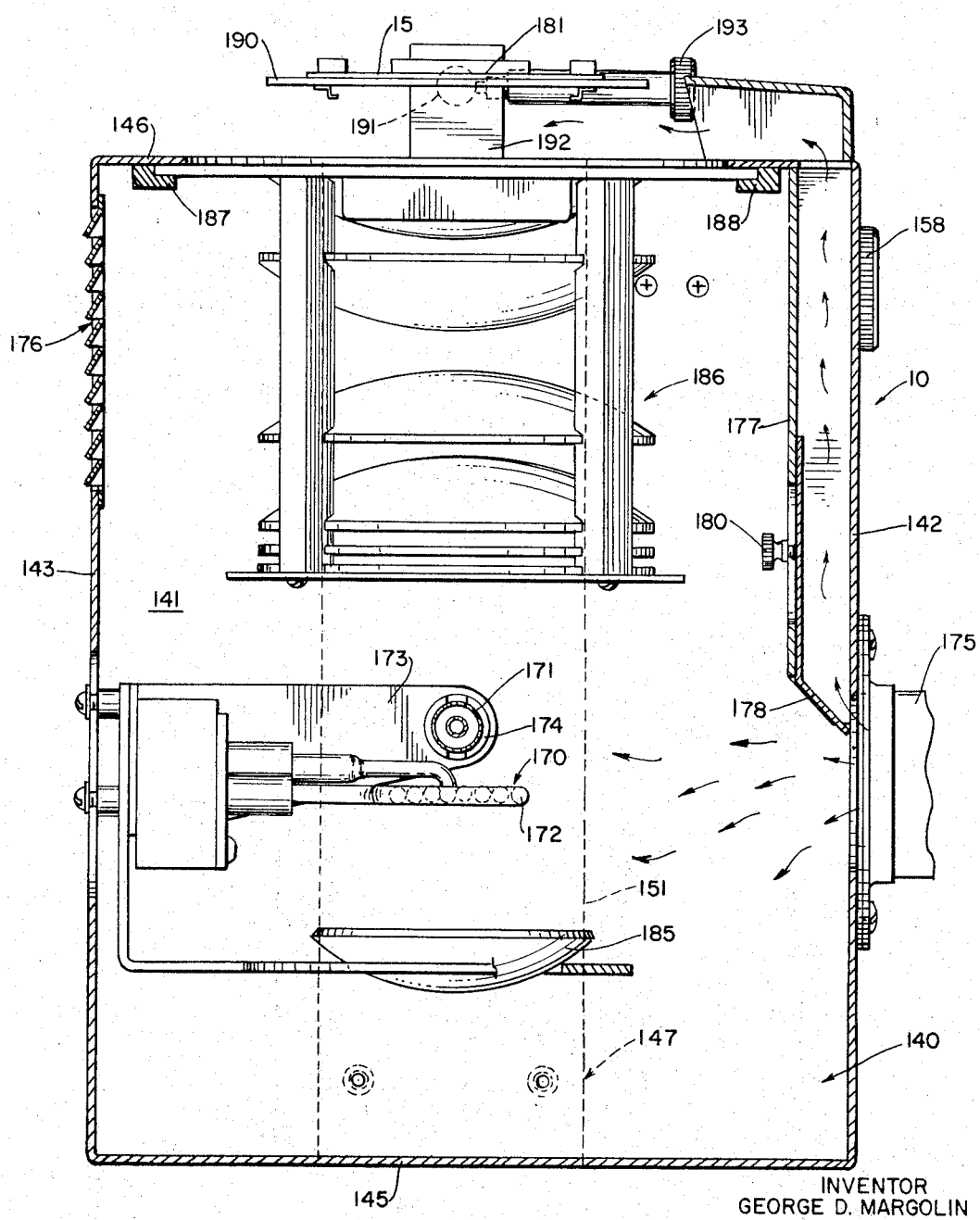

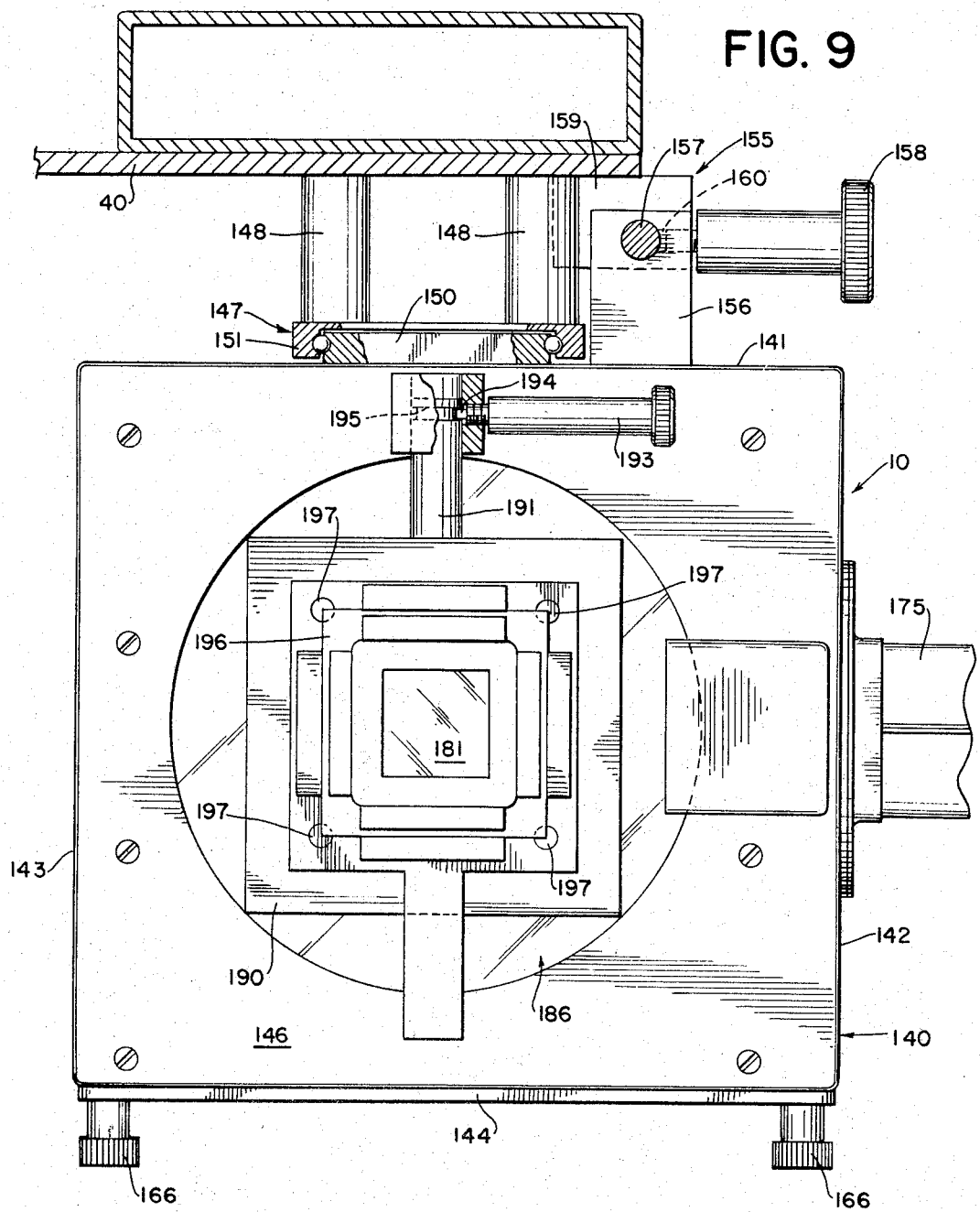

Nov. 7, 1967   G. D. MARGOLIN   3,350,980
PHOTOGRAPHIC APPARATUS
Filed Jan. 8, 1965   11 Sheets-Sheet 8
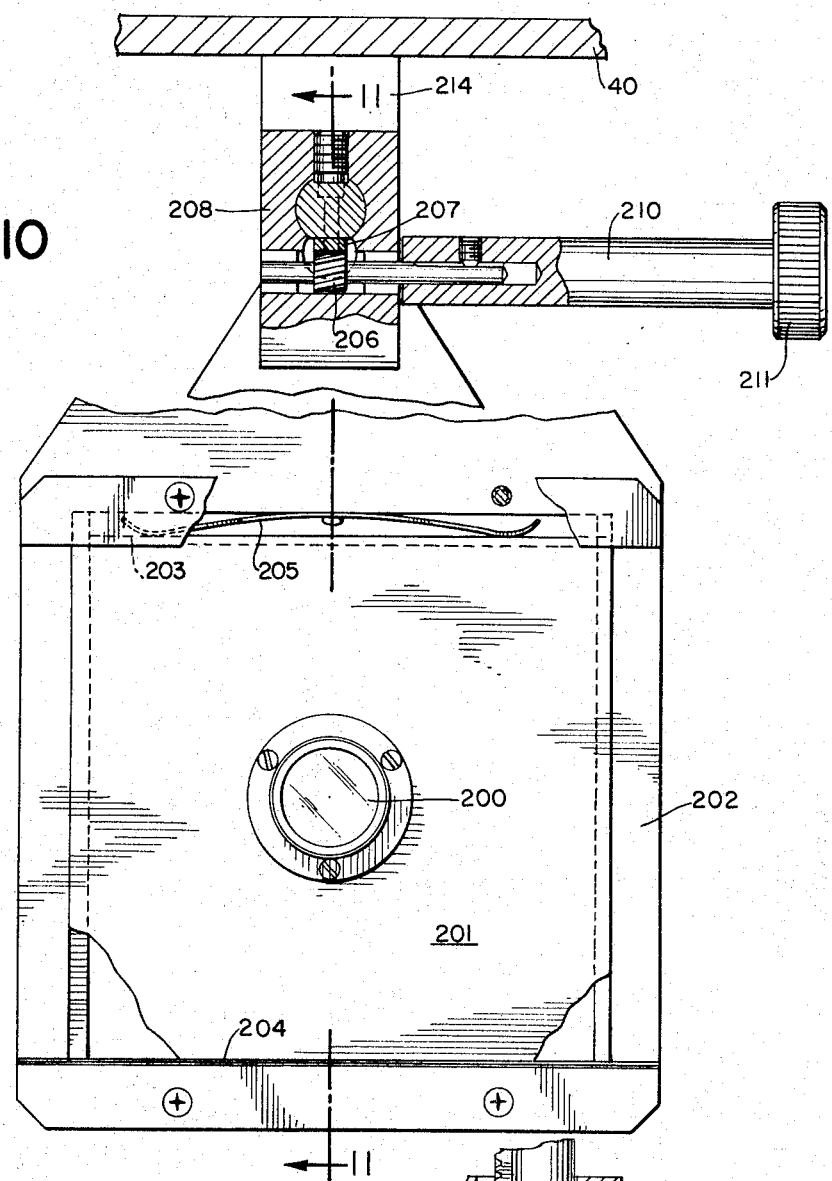
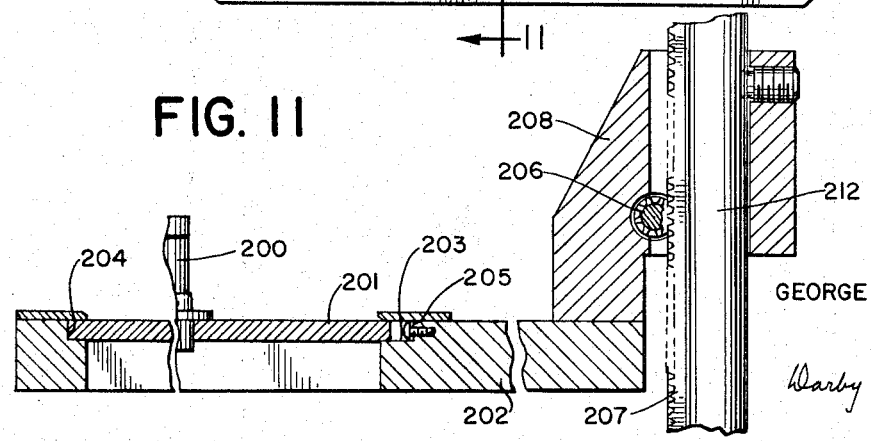
INVENTOR
GEORGE D. MARGOLIN
Darby & Darby
ATTORNEYS Nov. 7, 1967  G. D. MARGOLIN  3,350,980
PHOTOGRAPHIC APPARATUS
Filed Jan. 8, 1965  11 Sheets-Sheet 9

INVENTOR.
GEORGE D. MARGOLIN
BY
Darby & Darby
ATTORNEYS

United States Patent Office 3,350,980
Patented Nov. 7, 1967

3,350,980
PHOTOGRAPHIC APPARATUS
George D. Margolin, New York, N.Y., assignor to Front Projection Corporation, New York, N.Y., a corporation of New York
Filed Jan. 8, 1965, Ser. No. 424,337
12 Claims. (Cl. 88—24)

This invention relates to photographic apparatus, and more particularly to the structure and use of a camera, projector and screen combination for front projection photography.

In front projection photography, the photographer uses a camera, projector and screen to photograph a model in front of a background projected onto the screen by the projector. Photographs composed in this manner create an illusion that the model is photographed in front of the actual background rather than the artificially projected background. Conventional slide transparencies may be used with such equipment to project a limitless variety of backgrounds onto the screen.

In this invention a camera and projector are combined in a novel mounting arrangement to provide an efficient and effective integrated apparatus for front projection photography. The camera used may be any of a variety of conventional cameras. However, the screen must be of the reflex reflective type having a high degree of reflectivity and directionality for reasons explained below.

The projector used in this invention is novel, being constructed specifically for front projection photography as a part of the combined apparatus. An important element of this projector is the new type of lamp used for projecting the background image on the screen. Associated with the projector is a novel beam splitter and light trap assembly. The beam splitter reflects the projected background image from th projector onto the screen, and returns the composite image of the model and background to the camera. The light trap prevents stray light (other than light returning from the model and background screen) from entering the camera.

Equally important to the performance of the entire apparatus is the mounting arrangement for the camera, projector and beam splitter, which results in maximum flexibility of use along with optimum performance. More specifically, this mounting arrangement is made adjustable in a way which enables the photographer to control shadow problems (commonly called "black line" defects) associated with front projection photography.

In using this invention the photographer poses a model in front of projected background to produce the desired composite view, the projector and camera being focused to the desired sharpness. A relatively low powered light source provides the light for this focusing operation. The background image does not appear on the lighted side of the model, because of the highly directional property of the background screen as contrasted with the diffuse reflection from the model. A much higher powered strobe light is then actuated simultaneously with the opening of the camera shutter to provide the desired background brightness for the photograph. These operations will be described in more detail when each of the various components are described.

The advantages of this invention are obvious when one considers the cost and space requirements for photographing a model in front of an actual or rear projection background or alternatively against fabricated backdrops. With the use of the apparatus disclosed herein a model can be photographed in front of a series of varying backgrounds by simply changing the transparency projected onto the background screen. For instance, a fashion photographer might photograph any number of models against a wide variety of backgrounds in a relatively small studio by simply selecting the appropriate transparency for projection onto the background screen.

It is therefore the principal object of this invention to provide apparatus and methods for photographing composite pictures of a model in front of a projected artificial background.

It is another object of this invention to provide methods and apparatus for projecting an image onto a screen for use as an artificial background for front projection photography.

It is another object of this invention to provide adjustable and convenient camera, projector and beam splitter mounting arrangements especially adapted for use in front projection photography.

These and other objects of this invention will be more fully discussed in the following description with reference to the accompanying drawings wherein:

FIGURE 3 is a front elevation in partial section of the same embodiment;

FIGURE 4 is a cross-sectional view of the same embodiment taken along section line 4—4 of FIG. 3;

FIGURE 5 is a cross-sectional view of the same embodiment taken along section line 5—5 of FIG. 3;

FIGURE 6 is a side elevation in partial section of the equipment stand rear leg of the same embodiment;

FIGURE 7 is a cross-section view of the same embodiment taken along section line 7—7 of FIG. 6;

FIGURE 8 is a cross-sectional view of the same embodiment taken along section line 8—8 of FIG. 3;

FIGURE 9 is a cross-sectional view of the same embodiment taken along section line 9—9 of FIG. 2;

FIGURE 10 is a cross-sectional view of the same embodiment taken along section line 10—10 of FIG. 2;

FIGURE 11 is a cross-sectional view of the same embodiment taken along section line 11—11 of FIG. 10;

Figure 1:
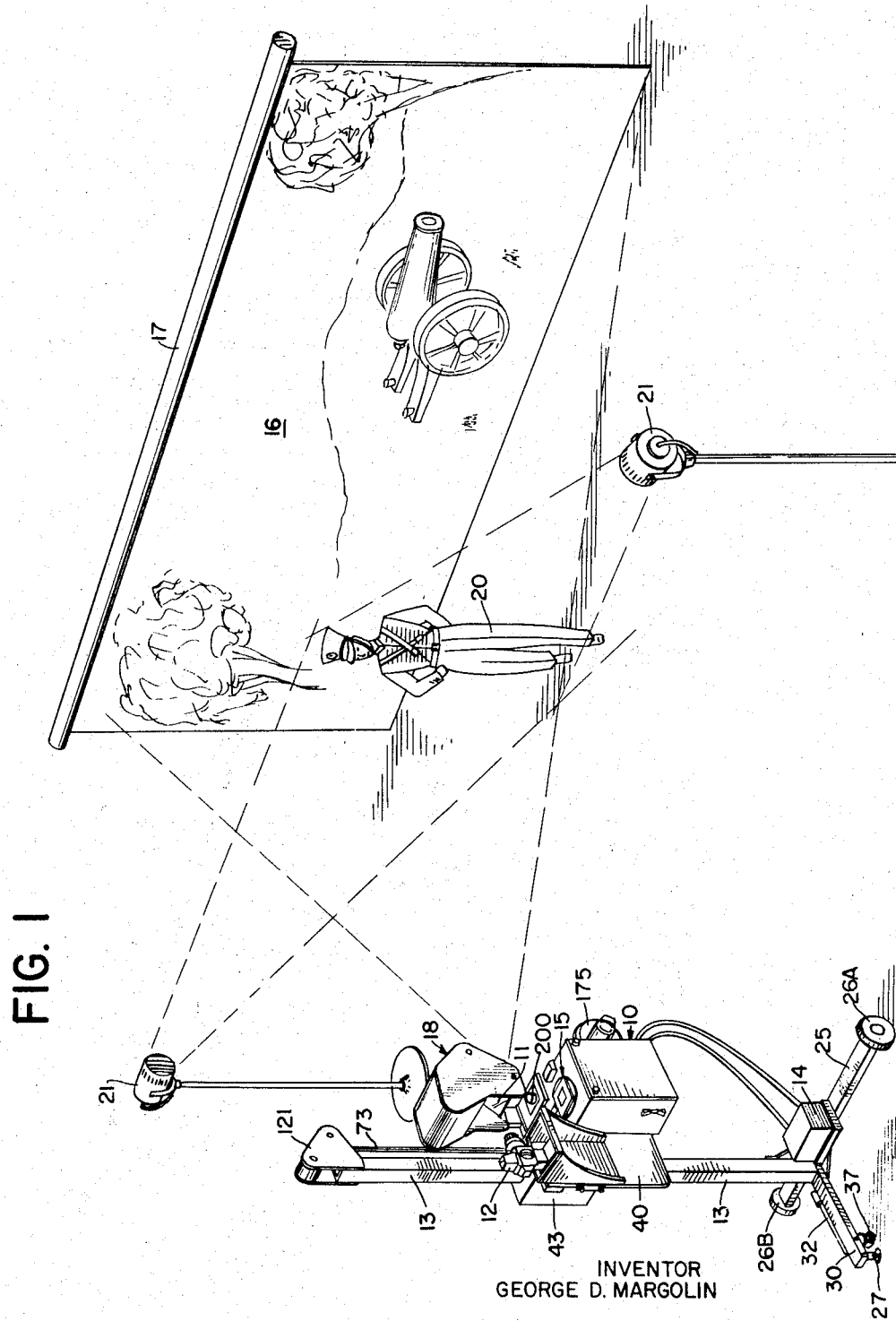
FIGURE 1 illustrates in perspective one embodiment of my invention.

FIGURE 1 illustrates the relationship between the principal elements of an embodiment of this invention. Projector 10, beam splitter 11 and camera 12 are mounted as a unit in an adjustable manner about monopost 13. Electrical power for illuminating projector 10 is supplied by battery power pack 14, which is housed on the base of monopost 13. Projector 10 illuminates transparency 15 so as to project background image 16 onto screen 17 after being reflected off beam splitter 11. That portion of the projected image which is not reflected onto screen 17 is trapped in light trap 18. Model 20 is posed in front of screen 17 between lamps 21. The composite image of model 20 and background image 16 is photographed by camera 12 through beam splitter 11.

Projector 10, beam splitter 11 and camera 12 are mounted in a fixed angular relationship, the axes of projector 10 and camera 12 being 90° apart with beam splitter 11 bisecting the angle between them at 45°. As a result, projector 10 is on the same virtual axis as camera 12. The reasons for this are detailed below.

Screen 17 is a highly directional and reflective reflex type screen. Light striking screen 17 should reflect straight back to the light source, and other light striking screen 17 from different directions should be invisible to a viewer located at this light source. With a preferred screen in order for an observer to see the reflection of a light source on screen 17, the observer must view the screen from a point within close proximity of the light source.

Although model 20 is posed directly in the path of the projected image from beam splitter 18, the projected image does not appear on model 20 in the finished photograph. There are three reasons for this. The first is that the directional reflectivity of screen 17 is much higher than the lighted side of model 20, which normally is a light diffusing surface. Consequently, very little light from the projected image is reflected by model 20 back to camera 12. In contrast, screen 17 reflects practically all of background image to camera 12, since camera 12 and projector 10 are on the same virtual axis. Also, model 20 is lighted from either side by lamps 21 which tend to mask out whatever image is projected on model 20 by projector 10. Lighting from the side in this manner does not reduce the contrast of image 16 on background screen 17, however, since the light is reflected directly back to the lamps 21 rather than toward camera 12 due to the above described directional properties of the screen 17. The third reason why the background image 16 does not show on the lighted side of a model 20 is that the image 16 is usually not in focus at the point where model 20 normally poses. Being out of focus, no discernible image pattern is evident on model 20.

Having described the principal operating components of the system and briefly pointing out their relationships to each other and their respective functions, each of these components along with associated equipment will now be described in detail.

The principal operating components of this apparatus, i.e., projector 10, beam splitter 11, and camera 12, are adjustably mounted about a mounting post assembly through rigid mounting plate 40. Referring to FIGURES 1, 6 and 7, this mounting post assembly comprises monopost 13, which is rigidly connected perpendicular to base 25. Base 25 is mobile on two freely rotatable wheels 26 A and B and a third support point, this third point being either retractable skid 27 or swivel caster 37.

Skid 27 is threaded into spacer 28 on the under side of rear leg 30, being locked by lock nut 31. In the position shown in FIGURE 6, skid 27 extends below the supporting position of caster 37 and thus brakes wheels 26A and B against rolling, thereby preventing inadvertent movement of monopost 13, once it is positioned in the desired location.

When the operator wants to reposition monopost 13, he lifts handle 32 to disengage it from clip 33 (see FIG. 4) on rear leg 30. This pivots handle 32 and turns shaft 34 to which it is connected, shaft 34 being free to rotate in leg 30. Shaft 34 has a cam surface inside leg 30 that engages the upper end of bar 35. Bar 35 is freely housed in bushing 36 which is fixed to the bottom of leg 30. Connected to the bottom of bar 35 is swivel caster 37.

The cam surface of shaft 34 is shaped so as to push bar 35 downwardly when handle 32 is raised to the vertical position thereby extending swivel caster 37 downwardly to bear against the floor and raises skid 27 off the floor. When caster 37, instead of skid 27, is thus supporting rear leg 30, monopost 13 may be easily repositioned. Once the new desired position is reached, handle 32 is lowered into engagement with clip 33. This retracts caster 37 and thereby brings skid 27 back down onto the floor which then resumes its braking function to prevent inadvertent lateral shifting of monopost 13.

Referring to FIGURES 3 and 4, plate 40 is connected to monopost 13 by shaft 41, one end of which connects to hub 42 rigidly fastened on plate 40, and the other end being rotatably connected to monopost 13 through trolley 43 by means to be described below. Shaft 41 is rotatably mounted to trolley 43 to permit tilting of plate 40 and thereby permit elevating or depressing of the axes of projector 10, beam splitter 11 and camera 12.

A tilt lock mechanism 50 is provided to lock plate 40 at the desired angle of elevation. Lock mechanism 50 comprises a friction disc 51 which is rotatable with and axially mounted on shaft 41 by means of keyed collar 52. The peripheral section of disc 51 passes between brake pads 53 and 54, pad 53 being fixed in housing 55 on trolley 43. Pad 54 is mounted on shaft 56 which may be pushed toward pad 53 to lock disc 51 against pad 53 and thereby lock plate 40 at the desired tilt angle. A wire spring inside housing 55 (not shown) biases shaft 56 and pad 54 away from disc 51, which is the unlocked position. Rotation of handle 57 turns attached cam 58 to push shaft 56 and pad 54 into engagement with and thereby lock disc 51. When handle 57 is turned to the brake release position, the surface of cam 58 allows shaft 56 and pad 54 to withdraw away from and remove all braking action on disc 51.

Thus, plate 40 and the attached projector 10, beam splitter 11 and camera 12 may be tilted with respect to monopost 13 by releasing lock mechanism 50 on shaft 41 and manipulating plate 40 to the desired tilt angle. Once this angle is reached, handle 57 may be turned to clamp pads 53 and 54 against disc 51 and thereby lock plate 40 in the selected position.

The height of plate 40 on monopost 13 may also be varied by raising or lowering trolley 43 to which shaft 41 is rotatably mounted. Trolley 43 and the attached equipment may be manipulated up or down monopost 13 until the desired height is reached, thus permitting the operator to select not only the angle of elevation for his photograph, but also permitting him to select the height from which this photograph may be taken. The means required for this height adjustability will now be described with particular reference to FIGURES 3, 4 and 5.

Trolley 43 comprises casing 60 with shaft bearing 61 and shaft end bearing 62 in opposite sides. Shaft 41 is aligned free to rotate in bearings 61 and 62 and axially positioned by a conventional set screw-collar retainer on in shaft end bearing 62.

Casing 60 fits around and is tracked on monopost 13 by four pairs of rollers 63A and B, 64A and B, 65A and B, and 66A and B. The vertical position of casing 60 on monopost 13 is controlled by handwheel 70 through a worm/sprocket gear assembly 71 engaged to chain 72 which spans the height of monopost 13. Rotation of handwheel 70 in one direction causes casing 60 to move up on chain 72, while opposite rotation causes it to move down. Spring assembly 73 (see FIG. 2), which is connected at its lower end to casing 60 and at its upper end to the top of monopost 13, counterbalances the weight of trolley 45 and the equipment attached to it.

Raising and lowering of trolley 43 by a counterbalanced gear and chain transmission in the above described manner is highly advantageous for convenient use of this equipment. Trolley 43 and the projector 10, beam splitter 11 and camera 12 connected to it are too cumbersome to permit effective use unless means of the above type are employed. This mounting arrangement permits the photographer to position his equipment at the precise elevation and angle he desires with a minimum of effort.

Once the photographer positions trolley 43 at the desired height on monopost 13, trolley 43 may be locked at that height by turning handle 80 to engage levation lock assembly 81 by means now to be described in detail.

Referring to FIGURE 4, rollers 63A and B are mounted free to rotate on roller shaft 85 which is fixedly mounted at each end to casing 60 by conventional cap screws 86. Roller 63A fits between casing 60 and the adjacent corner of monopost 13, whereas roller 63B is between monopost 13 and collar 87. Collar 87 is sized to maintain rolling engagement between rollers 63A and B and monopost 13. The other rollers 64A and B, 65A and B, and 66A and B are mounted in casing 60 in the same manner.

Casing 60 may be vertically adjusted on monopost 13 by turning handwheel 70, which as pointed out above engages chain 72 through worm/sprocket gear assembly 71. Handwheel 70 is connected to crank shaft 90, which is connected at its opposite end to worm gear 91. Shaft 90 passes through casing 60 and is positioned in gear housing 92 by bearing 92A in one side of housing 92 and by extending through the opposite side of housing 92, being rotatably positioned there by two retaining rings 93A and B. Housing 92 is mounted in casing 60 by conventional threaded fasteners.

Shaft 90 is thus positioned to engage worm gear 91 with a mating worm 95 of gear assembly 71, which is rotatably mounted on shaft 97. Sprocket gear 100 is pin-connected to the other end of gear assembly 71. Shaft 97 is fixedly mounted in gear housing 92, and gear assembly 71 revolves about it, being kept in the desired axial position by retaining ring 101.

Thus, handwheel 70 turns worm gear 91, and worm gear 91 turns sprocket gear 100.

Sprocket gear 100 engages chain 72, which as discussed above spans the height of monopost 13, being connected at the top to a conventional bracket (not shown) and at the bottom to bracket 106. Bottom bracket 106 is provided with a threaded chain tensioning device 107 to permit adjustment to maintain tension on chain 72. This is required in order to obtain precise control of the height of trolley 43 on monopost 13.

Chain 72 is guided into engagement with sprocket gear 100 by upper idler sprocket 110 which is rotatably mounted in gear housing 92 by screw 111 and by a similarly mounted lower idler sprocket (not shown). Thus, when handwheel 70 is turned, this turns sprocket gear 100 by means of the above described transmission, and rotation of sprocket gear 100 causes trolley 43 to travel up or down monopost 13 on chain 72 dependent on the direction of rotation.

Spring assembly 73 (FIGS. 2 and 3) counterbalances the weight of trolley 42 and the equipment attached to it to facilitate the movement of trolley 43 up and down monopost 13. Spring assembly 73 preferably comprises two opposed, constant tension, Negator type springs 115 and 116 mounted together at their lower ends to casing 60 by bolts 117 and mounted separately at their upper ends to reels 118 and 120 respectively. Reels 118 and 120 are rotatably mounted on parallel axes in spring housing 121 which is bolted to the upper end of monopost 13.

When trolley 43 and the attached equipment are at the desired height above monopost base 25, the operator may lock trolley 43 at this height by turning handle 80 to engage trolley lock assembly 81. Handle 80 is connected through hub 125 to threaded lock shaft 126, which passes through one side of casing 60 and is rotatably held in the opposite side by cap screw 127. Guide rod 128 extends parallel to shaft 126 in casing 60, being held in that position by cap screws fastening each end to opposite sides of casing 60.

Threaded lock plate 131 has two holes, one of which is threaded for engagement with shaft 126, and the other is sized slightly larger than guide rod 128 around which it is loosely fitted. Rod 128 thus positions plate 131 such that when shaft 126 is turned, plate 131 moves axially on shaft 126 and rod 128. Rod 126 also positions plate 131 so as to locate brake pad 132, which is fixed in the other end of plate 131, adjacent one side of monopost 13.

Also mounted on shaft 126 and rod 128 is a second lock plate 133, which differs from the first only in that it is not threaded, i.e., plate 133 rides freely on both shaft 126 and rod 128. Plate 133 is similarly aligned with its brake pad 134 adjacent the opposite side of monopost 13.

When handle 80 and connected shaft 126 are turned in one direction, plate 131 is drawn toward monopost 13 and toward plate 133, causing brake pads 132 and 134 to clamp tightly against opposite sides of monopost 13. This firmly locks trolley 43 to monopost 13. This lock may be released by simply turning handle 80 in the opposite direction.

Referring now to the components attached to mounting plate 40, the first which will be described in detail is the projector 10.

Referring to FIGURES 2, 3, 8 and 9, projector 10 comprises a light box 140, having a back 141, right side 142, left side 143, front 144, bottom 145 and top 146. Box 140 is adjustably mounted to mounting plate 40 by slide 147, which is fastened through spacers 148 to mounting plate 40. Slide 147 comprises two slidable members, intermediate plate 150 and base plate 151, which are tracked to each other and freely slidable within each other by reason of ball bearing contact surfaces. Plate 150 is screw-fastened to back 141, and plate 151 is similarly fastened to mounting plate 40. Slide 147 is aligned on plate 40 to limit movement of box 140 to a path parallel to the axis of monopost 13. The purpose of this adjustability will be explained below.

Light box brake assembly 155 is used to lock light box 140 in the desired position on mounting plate 40. Brake assembly 155 comprises a brake lock 156 which is screw-fastened to light box back 141. Brake lock 156 fits loosely around brake shaft 157, and knob 158 which is threaded into block 156 may be turned to clamp a brake pad 160 against shaft 157 to lock box 140 in the desired position. Brake shaft 157 is fixed to plate 40 by brackets 159. Thus box 140 can be conveniently moved up and down on slide 147 and locked at any desired position by clamping brake lock 156 against shaft 157.

Light box front 144 is hinged along its lower edge to permit ready access to the interior of box 140. Front 144 is releasably fastened adjacent its upper edge to sides 142 and 143 by a pair of stand-off thumb nuts 166.

Lamp 170 is positioned inside box 140. Its purpose is to illuminate projector 10 for projecting background image 16 on screen 17. Two separate lighting requirements are dictated for lamp 170. The first is for projecting image 16 against background screen 17 with sufficient intensity to permit focusing model 20 against the background image 16. This lighting requirement will be referred to as the focusing light. The second lighting requirement is that required for projecting the image 16 during the photographing of model 20 and image 16. This lighting requirement will be referred to as the photographing light.

Both the focusing light and the photographing light are combined into a single unit (lamp 170) in this apparatus. The principal advantage of this arrangement is that no switching mechanism is required to shift from focusing to photographing light, and therefore there is no time lapse between the focusing operation and the photographing operation. By combining the two lights in a single lamp, the photographer can view the composite picture up to the instant of taking the photograph. Focusing light is furnished by incandescent iodine lamp 171, and photographing light is furnished by strobe tube 172. Lamp 171 and tube 172 are both plugged into lamp holder 173.

Iodine lamp 171 plugs into socket 174 in lamp holder 173. Power for lamp 170 may be provided from power pack 14 through suitable electrical leads and switches.

Photographing light is provided by strobe tube 172 which contains an ionizable gas such as xenon which after being charged to a predetermined potential discharges with a bright flash of actinic light characteristic of photo-strobe tubes. Tube 172 is spiral or helically shaped. Preferably, strobe tube 172 is centered below the center of the iodine lamp 171 and both are positioned at or near the preselected light source center by lamp holder 173. Lamp 171 may alternatively be centered below tube 172. In either arrangement tube 172 is triggered simultaneously with the taking of the photograph by a linkage to the camera shutter trigger.

Iodine lamp 171 generates a substantial amount of heat during the focusing operation. To prevent deterioration of the above described lamp elements, blower 175 provides cooling air to light box 140 which after cooling the lamp elements exits through louvres 176. Part of the cooling air is diverted by air duct 177 to pass over the top of box 140 (as indicated by the arrows). The amount of diversion is variable by adjusting the position of scoop 178 which is positioned by thumb-nut 180. The purpose of the diverted cooling air is to cool the transparency 181 positioned above projector 10.

Figure 14:
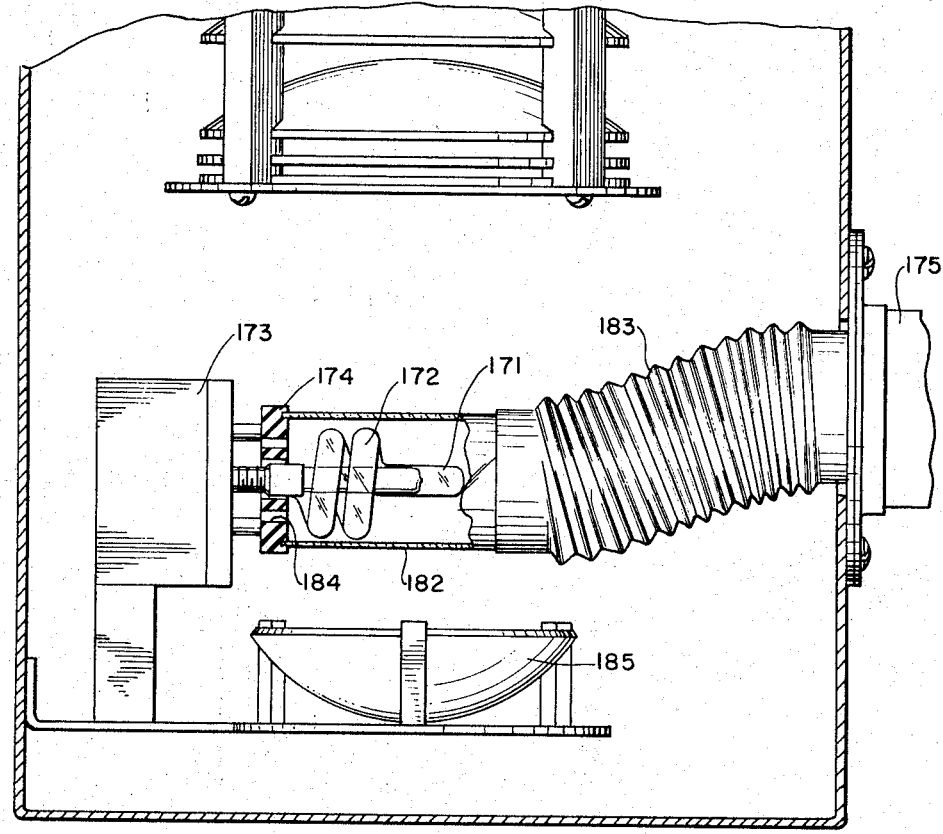
FIGURE 14 is a cross-sectional view of a projector light box with an alternative form of lamp for use in this invention.

An alternative form of lamp 170 is illustrated in FIGURE 14. This form differs from the above described form in that iodine lamp 171 is positioned on the central axis of the helically shaped tube 172. Both lamp 171 and tube 172 plug into socket 174 in lamp holder 173, and both are enclosed by an open ended quartz or glass envelope 182. One end of envelope 182 connects to flexible tube 183 which is connected to discharge duct of blower 175. The other end connects to socket 174 which has in it a perforation 184. Cooling air is thus directed straight to the lamp elements within envelope 182, and after cooling these elements, it exits through perforation 184 in socket 174.

The purpose of these projection-oriented lamp configurations is to provide the greatest usable light area to the optical path of projector 10, while at the same time permitting the light source to be miniaturized as much as possible. As the light source approaches a higher intensity yet smaller point size source, the light condensing system may be smaller, more effective and of shorter focal length. This permits miniaturizing the light box 140 at no sacrifice in performance.

Referring again to FIGURES 8 and 9, reflector 185 is positioned directly beneath lamp 170, being mounted on light box 140 on the bottom 145 or in lamp holder 173. The reflective surface of reflector 185 is shaped concave so as to reflect light from lamp 170 upwardly. This light passes through a light condenser system 186 which collects and converges it into an upwardly projected, converging cone of light. The light condenser system 186 is removably suspended from tracks 187 and 188 which are screw-fastened to the top 146. Top 146 has a circular hole through which the cone of light passes.

This cone of light illuminates transparency 181 which is tiltably mounted above light box 140 in the transparency tilting plate 190. Plate 190 is screw-fastened to tilt shaft 191, which is rotatably positioned in tilt block 192. Lock knob 193 threads into tilt block 192, having at its end a pin 194 which mates with a collar 195 on shaft 191. Turning of knob 193 either releases or locks shaft 191 dependent on the direction of rotation. Transparency 181 is positioned on tilt plate 190 by adapter plate 196 by means of magnets 197 mounted in such plate. Adapter plates 196 are preferably made for 2¼ by 2¼ transparencies and for 35 mm. transparencies.

This transparency tilting arrangement is employed so as to maintain focus over the entire image 16 projected by the transparency 181. Correction by tilting the transparency 181 is necessary when the image is projected along an axis other than perpendicular to the screen 17.

Referring to FIGURES 2, 3, 10 and 11, projector lens 200 is adjustably mounted directly above transparency 181 to focus image 16 on screen 17. Lens 200 is fastened to lens plate 201 which removably slips into lens mounting frame 202. This is accomplished by providing frame 202 with channels 203 and 204 and connecting spring 205 to the interior of channel 203. Plate 201 can be snapped into position between channel 203 and 204 by depressing spring 205 with the edge of plate 201 as it is being inserted.

This releasable lens mounting arrangement permits interchangeable use of various projection lenses by simply inserting the desired lens 200 for the particular transparency 181 being used.

Lens mounting frame 202 is adjustable in height above transparency 181 by means of a helical gear 206 and rack 207 mechanism. Frame 202 connects to lens mounting block 208 which rotatably houses lens focus shaft 210 to which is attached focus knob 211. Gear 206 is fixed to and rotates with shaft 210. Mounting block 208 fits around rack 207 and rack shaft 212 to which it is fastened. Shaft 212 is connected to mounting plate 40 at its upper end by screw fastened bracket 213 and at its lower end by screw fastened bracket 214.

Focusing of projector 10 can thus be accomplished in two steps, adjusting the vertical position of the entire light box assembly 140 on slide 147 and secondly by adjusting the position of lens 200 above the light box assembly 140. This permits maximum flexibility in projector set-up and also facilitates control of black line and shadow problems in a way to be discussed below.

Figure 2:
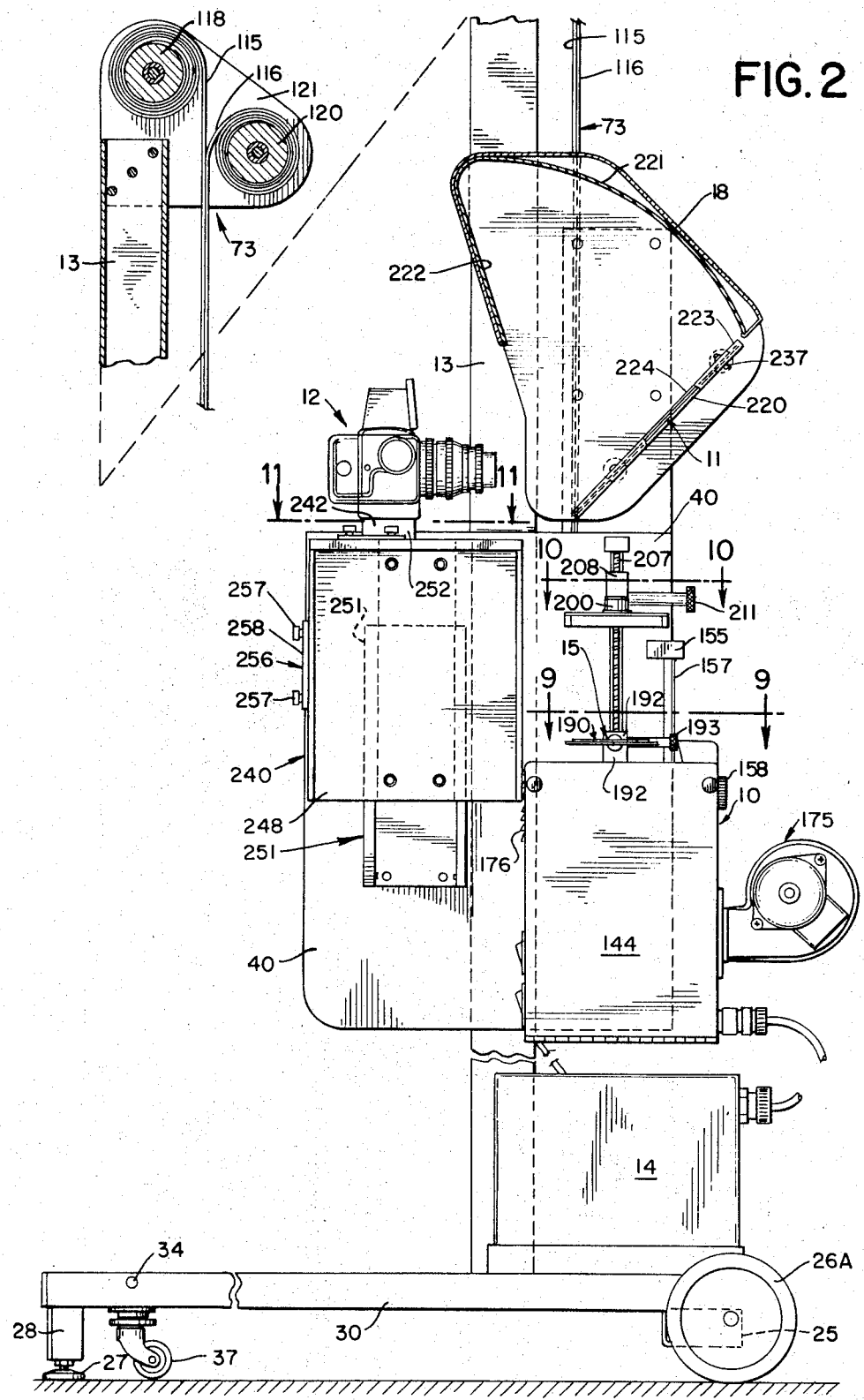
FIGURE 2 is a side elevation in partial section of the embodiment shown in FIG. 1.
Figure 12:
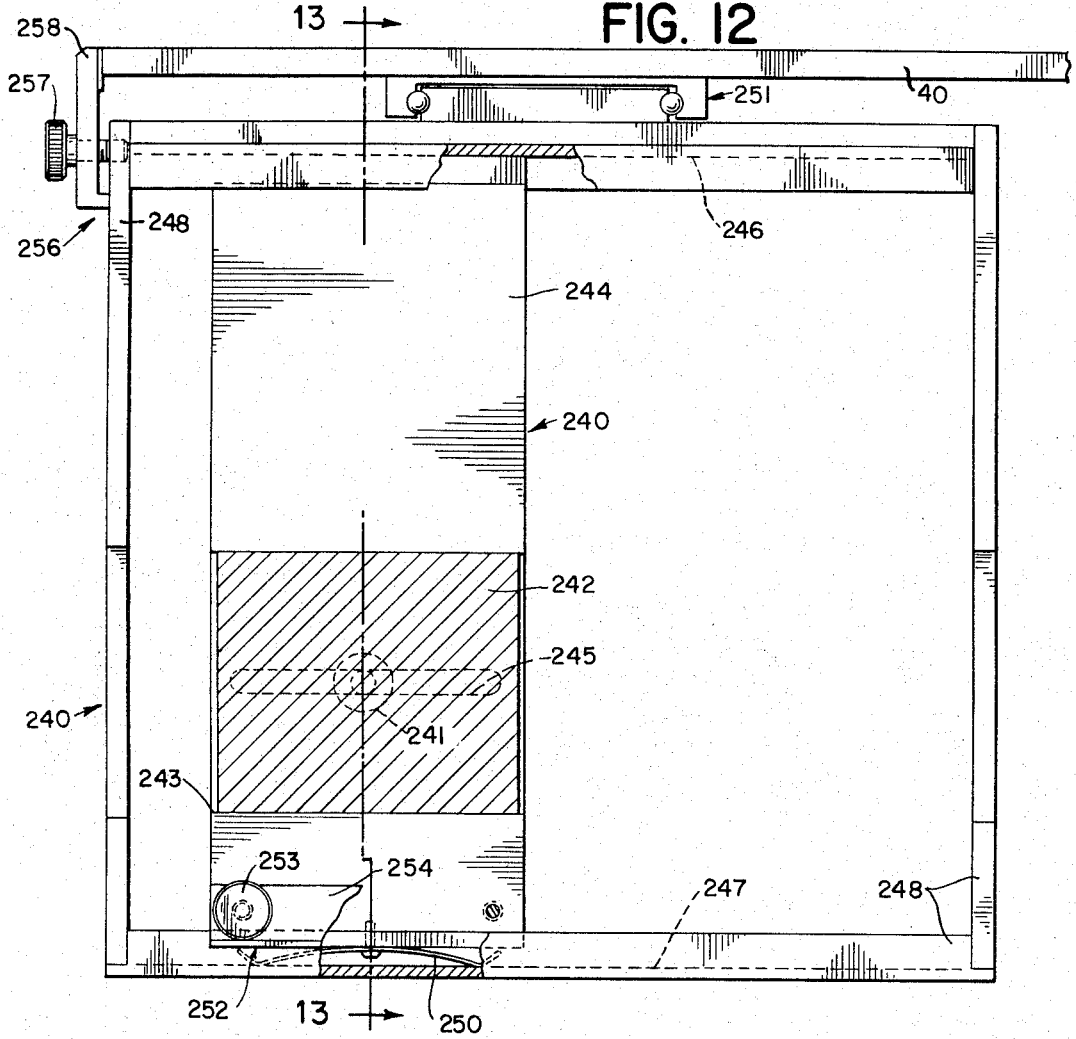
FIGURE 12 is a cross-sectional view of the same embodiment taken along section line 12—12 of FIG. 2.
Figure 13:
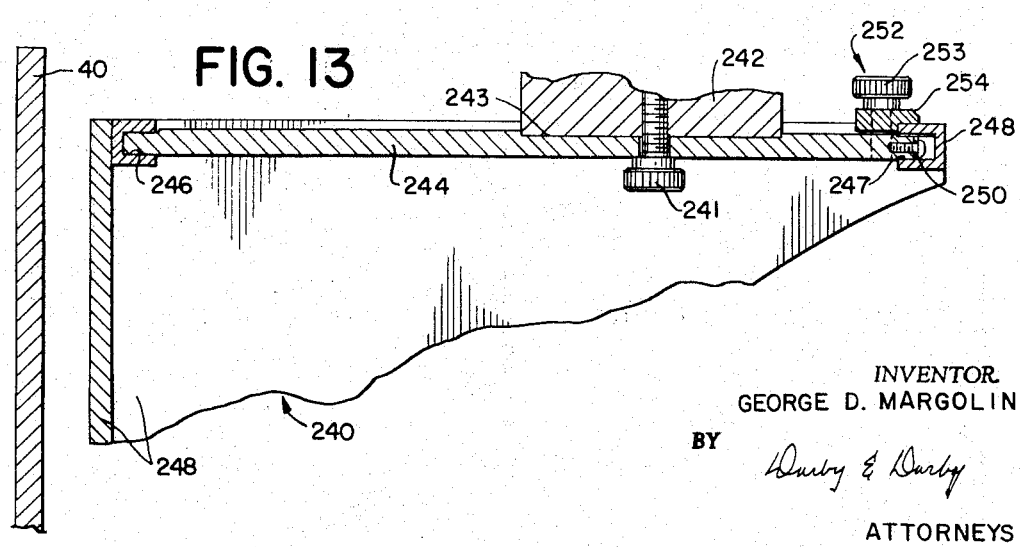
FIGURE 13 is a cross-sectional view of the same embodiment taken along section line 13—13 of FIG. 12.

Referring to FIGURES 2 and 3, beam splitter 11, which is positioned directly above projector 10, serves a dual function: (1) reflecting the projected image 16 onto screen 17 and transmitting the composite image of the background 16 and model 20 to the lens of camera 12, and (2) trapping stray light which is not part of the projection cone reflected onto screen 17 and preventing it from entering camera 12.

Beam splitter's 11 first function of reflecting and transmitting images is performed by semi-reflective mirror 220 mounted at a 45° angle to the axes of projector 10 and camera 12 within beam splitter 11. The second function of trapping of the light is performed by the combined reflective action of arcuate black mirror 221 and absorbent action of black velvet 222, both of which are mounted within beam splitter 11. These units are mounted in the following manner.

Semi-reflective mirror 220 slides into two side channels 223 and 224, being held in place at the bottom by screw-fastened flat bar 225 and retained at the top by conventional screws (not shown). Channel 223 is mounted through spacers 228 and 230 to adjacent sides of mirror box 231 by screws 232 and 233, respectively. Mirror box 231 is screw-fastened to mounting plate 40 in the position shown.

Screw 233 bears against washer 234 which is fastened to box 231 by three triangularly disposed screws (not shown), whereas screw 232 bears against washer 236 which is movable relative to box 231. Screw 232 fits through an arcuate slot 237 in the side of box 231. Slot 237 permits slight angular adjustment of mirror 221 relative to box 231 to permit precise alignment of mirror 221.

Channel 224 is similarly mounted to the opposite side of mirror box 231 to support mirror 220 in the same manner.

Referring to FIGURES 2, 3, 12 and 13, camera 12 is adjustably mounted on camera shelf 240 which is adjustable both vertically and horizontally relative to the camera/projection axis. Camera 12 is connected by a threaded hand nut 241 to mounting block 242 which is tracked in flat 243 of camera positioning plate 244. Hand nut 241 pases through an elongated slot 245 in plate 244 for purposes discussed below. Plate 244 is slidably tracked at its sides to channels 246 and 247 in camera shelf frame 248. Spring 250 is compressed between plate 244 and channel 247 for assuring true alignment of plate 244 in channels 246 and 247.

Frame 248 is screw-fastened to slide 251 in a manner identical to that used with slide 147 described above, and slide 251 is screw-fastened to mounting plate 40 in the same way.

Thus, slot 245 of mounting plate 244 and the sliding plate/channel mounting arrangement of plate 244 relative to frame 248 permit axial adjustment of camera 12 relative to beam splitter 11. Slide 251 permits vertical adjustment of camera 12 relative to beam splitter 11.

Lock assembly 252, comprising two stand/off hand nuts 253 and lock plate 254, permit the operator to lock plate 244 in the desired position. Nuts 253 may be turned to clamp plate 254 against frame 248 to accomplish the locking action.

Similarly, lock assembly 256, comprising two standoff hand nuts 257 and plate 258, may be used by the operator to lock frame 248 relative to mounting plate 40, the operator turning screws 257 to clamp plate 258 against mounting plate 40.

The above described camera/projector mounting arrangement is important, since it permits the interchangeable use of a variety of cameras under the following conditions:

(1) The axis of camera 12 is kept at a 45° angle to beam splitter 11 and at a 90° angle to the axis of projector 10, thus keeping camera 12 and projector 10 on the same virtual axis;

(2) Camera 12 may be positioned at the same level as the projection axis of projector 10; and (3) The relative distances of the objective lenses of camera 12 and projector 10 are variable within a certain range to permit repositioning of these lenses relative to each other. The importance of these conditions will be evident from the following discussion of shadow defects encountered in front projection photography.

Figure 15:
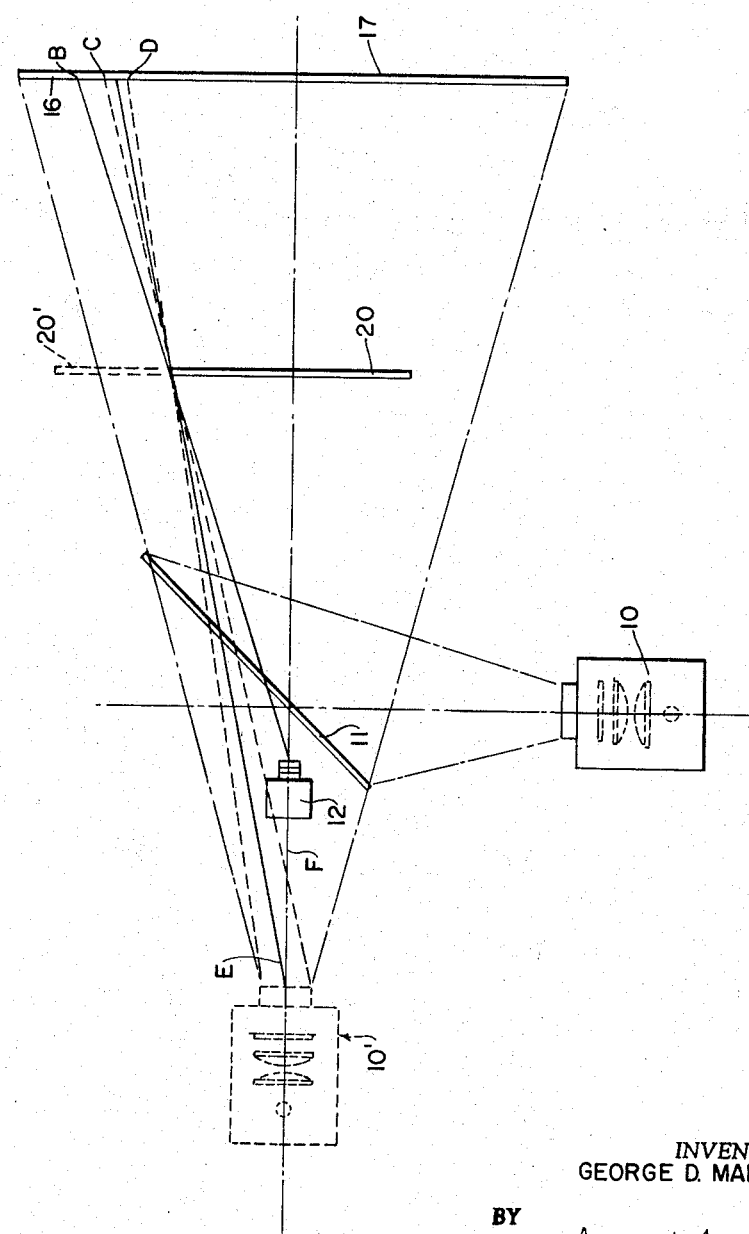
FIGURE 15 is a schematic view of an embodiment of this invention illustrating the relationship between the camera and projector mounting arrangements and black line defects.

Referring to FIGURE 15, a schematic drawing of the components of this apparatus illustrate shadow problems encountered with the apparatus. Projector 10 reflects off beam splitter 11 to form image 16 on screen 17. The phantom position of projector 10 is indicated in dashed line on the same axis on which camera 12 is mounted. Thus, the projected (16) and model 20 images enter camera 12 along this same axis.

Accurate alignment of camera 12 and projector 10 on this axis is essential to avoid the first type of shadow effect known as misalignment shadow. The cause of this defect is apparent from a consideration of the angular relationships shown in FIGURE 15. If camera 12 and projector 10 were not mounted coaxially (not shown), model 20 would cast a shadow on screen 17 which would block out part of the projected image 16. That part of image 16 which would thus be blocked out would appear as a shadow in the composite picture photographed by camera 12.

A second shadow defect results from the fact that projector 10' does not project an image from a point light source. Because of this, model 20 casts a shadow on the screen 17 which has a central umbra surrounded by a penumbra which varies from dark at point D to light at point B. This penumbral band varies from full brightness at point B to half brightness at point C to no brightness at point D. The area between points C and D are the fringe areas which cause an undesirable shadow.

This shadow defect can be controlled by the proper placement of projector 10 relative to camera 12. If the lens of camera 12 is positioned where the lens of phantom projector 10 is located (point E), then the C-D fringe area will show and thus cause the undesirable shadow. If, however, the lens of camera 12 is placed in the position shown in FIGURE 15, there will be no shadow, because at this position camera 12 sees only the fully illuminated part of background image 16 on screen 17, the rest being blocked out by model 20. Point F on the camera projector axis, where a line from the lower left corner of the lens of projector 10 to the external edge of model 20 intersects the axis, is the threshold point for the location of the lens of camera 12, forward of which there will be no shadow appearing in the finished photograph provided that camera 12 and projector 10 are kept on the same axis, and provided further that model 20 is positioned on or near that axis.

If model 20 is posed at distance off this axis, (model 20' position) or if model 20 is posed with part of the body forming a light stop between this axis and an outside edge of model 20, then the shadow problem from this inner edge would be aggravated by positioning the lens of camera 12 in front of the lens of projector 10. Inside shadows from inner edges are made worse by moving camera 12 in front of projector 10. They are corrected by moving projector 10 in front of camera 12.

Thus, it can be seen that each photograph presents its own peculiar shadow problem. By mounting camera 12 and projector 10 in the above described manner, the photographer may freely adjust them relative to each other to arrive at optimum position for each picture.

While this description has been directed principally to a particular embodiment of this invention and to certain alternative subcombinations for use with this embodiment, it must be understood that the invention is not limited to the specific mechanisms disclosed. For example, the camera may view the composite image as reflected by the beam splitter, and the projector may transmit the background image through the splitter, as by reversing the position of the camera and projector relative to the beam splitter. The beam splitter may also take forms other than semi-reflective; in certain applications it may be preferable to use a fully reflective mirror with a central aperture. Other modifications, improvements and variations in structure and use of the disclosed equipment will undoubtedly be apparent to those skilled in the art, but these changes are comprehended by this invention so long as they are covered by the claims which follow. Therefore, it is to be understood that the invention is not to be limited by the foregoing description, but that it is to be defined solely by the claims granted herein.

What is claimed is:

1. An integrated camera projector apparatus comprising in combination:
    (a) a camera and associated camera lens,
    (b) a projector and associated projector lens for projecting a transparency image,
    (c) a semi-reflective beam splitter operatively associated with said camera and projector for reflecting such image from said projector to a screen and for transmitting such image back from the screen through the splitter to said camera on an axis coaxial to the optical axis of said camera lens, and
    (d) means for varying the optical path distance between said camera lens and said projector lens along said axis.

2. An integrated camera projector apparatus as claimed in claim 1, wherein said means for varying the optical path distance comprise means for varying such distance while maintaining said coaxial alignment of the transmitted image axis and camera lens axis.

3. An integrated camera projector apparatus comprising in combination:
    (a) a camera and associated camera lens,
    (b) a projector and associated projector lens for projecting a transparency image,
    (c) a semi-reflective beam splitter for reflecting and transmitting predetermined amounts of incident light,
    (d) means for mounting said camera, projector and beam splitter,
        said mounting means positioning the beam splitter diagonally to the projector and camera lens optical axes to reflect the image from said projector to a screen and transmit such image back from said screen through the splitter to said camera on an axis coaxial to the optical axis of said camera lens, and
    (e) means for varying the optical path distance between said camera and projector lenses along said image axis.

4. An integrated camera projector apparatus as claimed in claim 3, wherein said mounting means adjustably positions said camera and projector on optical axes intersecting on the reflective surface of said beam splitter.

5. An integrated camera proector apparatus as claimed in claim 4, wherein said means for varying the optical path distance comprise means for moving said camera lens along said image axis.

6. An integrated camera projector apparatus as claimed in claim 4, wherein said means for varying the optical path distance comprise means for moving said projector lens along its optical axis.

7. An integrated camera projector apparatus comprising in combination:
 (a) a camera and associated camera lens,
 (b) a projector and associated projector lens for projecting a transparency image,
 (c) a semi-reflective beam splitter for reflecting and transmitting predetermined amounts of incident light,
 (d) a substantially rigid support plate for supporting said camera, projector and beam splitter, and
 (e) means for adjustably mounting said camera, projector and beam splitter on said support plate,
  said mounting means positioning said beam splitter diagonally to the projector and camera lens optical axes to reflect such image from said projector to a screen and transmit such image back from the screen through the splitter to said camera on an axis coaxial to the optical axis of said camera lens,
  said mounting means comprising means for varying the optical path distance between said camera and said projector along said axis.

8. An integrated camera projector apparatus as claimed in claim 7, wherein said mounting means adjustably positions said camera and projector on optical axes intersecting on the reflective surface of said beam splitter.

9. An integrated camera projector apparatus as claimed in claim 8, wherein said means for varying the optical path distance comprise means for moving said camera lens along said image axis, and means for moving said projector lens along its optical axis.

10. An integrated camera projector apparatus as claimed in claim 7 further comprising means for repositioning said support plate, transparency mounting means for holding a transparency for projection by said projector, and means for repositioning said transparency mounting means for refocusing the projected image when said support plate is repositioned.

11. An integrated camera projector apparatus comprising in combination:
 (a) a camera and associated camera lens,
 (b) a projector and associated projector lens for projecting a transparency image,
 (c) a semi-reflective beam splitter for reflecting and transmitting predetermined amounts of incident light,
 (d) a transparency mount for holding a transparency for projection by said projector,
 (e) a substantially rigid support plate for supporting said camera, projector, beam splitter and transparency mount,
 (f) means for selectively repositioning said support plate, and
 (g) means for adjustably mounting said camera, projector, beam splitter and transparency mount,
  said mounting means positioning said splitter diagonally to the projector and camera lens optical axes and positioning such axes to intersect on the reflective surface of said splitter and to reflect the image from said projector to a screen and transmit such image back from the screen through the splitter to said camera on an axis coaxial to the optical axis of said camera lens,
  said mounting means comprising
   (i) means for moving said camera lens relative to said projector lens along their respective optical axes, and
   (ii) means for repositioning said transparency mount for refocusing the projected image when said support plate is repositioned.

12. Light trapping means for use in association with a projector, beam splitter and camera in front projection photography comprising an enclosure having an inner light reflective surface and an inner light absorbent surface, said surfaces being disposed relative to each other so as to successively reflect and absorb light transmitted through said beam splitter into said enclosure by said projector, said reflective surface having an arcuate cross-section having a radius and center of curvature selected to reflect the transmitted light onto said light absorbent surface and thereafter to reflect that amount of light not absorbed by said absorbent surface in a direction other than toward said camera and projector.

References Cited
UNITED STATES PATENTS

| | | | |
|---|---|---|---|
| 2,164,770 | 7/1939 | Gregory | 352—89 |
| 2,725,783 | 12/1955 | Jackson | 352—243 |
| 2,772,600 | 12/1956 | Walker | 352—89 |
| 2,780,720 | 2/1957 | Bertrams | 240—1.3 |
| 2,818,771 | 1/1958 | Armbruster | 88—26 |
| 2,965,747 | 12/1960 | Secofsky | 240—1.3 |
| 3,007,370 | 11/1961 | McMaster et al. | 88—26 |
| 3,044,346 | 7/1962 | Fieux | 352—243 |
| 3,227,509 | 1/1966 | Baker | 352—89 |

JOHN M. HORAN, *Primary Examiner.*

NORTON ANSHER, *Examiner.*

R. WINTERCORN, *Assistant Examiner.*